United States Patent [19]

Morales

[11] Patent Number: 4,854,089
[45] Date of Patent: Aug. 8, 1989

[54] METHOD OF MAKING A RIGID GAS PERMEABLE BIFOCAL CONTACT LENS

[75] Inventor: Heriberto Morales, Scottsdale, Ariz.

[73] Assignee: Sola U.S.A. Inc., Sunnyvale, Calif.

[21] Appl. No.: 171,155

[22] Filed: Mar. 16, 1988

Related U.S. Application Data

[63] Continuation of Ser. No. 720,192, Apr. 5, 1985, abandoned.

[51] Int. Cl.⁴ .................................................. B24B 13/00
[52] U.S. Cl. .................................. 51/284 R; 51/284 E; 51/323; 51/327; 82/1.11; 409/131
[58] Field of Search ........... 51/216 LP, 217 L, 284 R, 51/284 E, 323, 326, 327; 82/1 C, 12; 409/131, 132; 264/2.7; 351/160 R, 160.4, 161, 162

[56] References Cited

U.S. PATENT DOCUMENTS

| | | | |
|---|---|---|---|
| Re. 31,406 | 10/1983 | Gaylord | 526/279 |
| 3,031,927 | 5/1962 | Wesley | 351/161 |
| 3,279,878 | 10/1966 | Long | 351/161 |
| 3,300,909 | 1/1967 | Copper et al. | 51/284 |
| 3,597,055 | 8/1971 | Neefe | 351/161 |
| 3,662,040 | 5/1972 | Urbach et al. | 51/284 R X |
| 3,773,868 | 11/1973 | Bronstein | 51/284 R X |
| 3,808,178 | 4/1974 | Gaylord | 526/279 |
| 3,900,250 | 8/1975 | Ivani | 351/160 |
| 3,909,982 | 10/1975 | Schlotfeldt | 51/284 R X |
| 3,950,082 | 4/1976 | Volk | 351/169 |
| 4,199,231 | 4/1980 | Evans | 351/160 |
| 4,202,848 | 5/1980 | Neefe | 264/1 |
| 4,216,303 | 8/1980 | Novicky | 528/32 |
| 4,239,712 | 12/1980 | Neefe | 264/1 |
| 4,318,595 | 3/1982 | Van der Kolk et al. | 351/160 H |
| 4,324,461 | 4/1982 | Salvatori | 351/160 H |
| 4,618,229 | 10/1986 | Jacobstein et al. | 351/161 |

FOREIGN PATENT DOCUMENTS 2033101 5/1969 United Kingdom ................ 351/161

OTHER PUBLICATIONS

Taylor, C. McKay, *The Offset Variable Bifocal Corneal Lens,* The Optician, vol. 149, No. 3860, Mar. 26, 1965, pp. 287–288.

Mandell, Robert B., *Contact Lens Practice,* Third Edition, 1981, pp. 704–731.

Primary Examiner—Robert P. Olszewski
Attorney, Agent, or Firm—Cates & Phillips

[57] ABSTRACT

A bifocal contact lens is disclosed, having a posterior surface with a base curve, and an anterior surface having a distance vision curve defining a distance vision optical zone and a near vision curve defining a near vision optical zone. A first prism component is incorporated into the base curve. A second prism component is incorporated into the distance vision curve. A process for manufacturing the bifocal contact lens by lathe cutting is also disclosed.

7 Claims, 3 Drawing Sheets

METHOD OF MAKING A RIGID GAS PERMEABLE BIFOCAL CONTACT LENS

This is a continuation of U.S. patent application Ser. No. 06/720,192, filed 04/05/85, now abandoned.

FIELD OF THE INVENTION

The present invention relates to bifocal contact lenses, more particularly to a rigid gas permeable bifocal contact lens, and specifically to an alternating vision, prism ballasted, rigid, gas permeable, non-fused (or single material) bifocal contact lens, having an upcurved, crescent-shaped near vision segment and incorporating prism in both the posterior (or base) curve and on the anterior (or front) curve in the distance vision segment. The lens is substantially circular; it may, optionally, be truncated at its bottom.

BACKGROUND OF THE INVENTION

With an aging population (about age 40 and older), a need exists for the rapid and efficient correction of vision with a single device for both near and far distances. An aging person often may be afflicted with presbyopia, alone or in combination with myopia and hyperopia, and the impairment of vision due to advancing years. Presbyopia results in a diminution of the power of accommodation from loss of elasticity of the crystalline lens of the eye (and the change in the shape of the lens), causing the near point of distinct vision to be removed further from the eye. Hyperopia is described as that error of refraction in which rays of light entering the eye parallel to the optic axis are brought to a focus behind the retina, causing blurred vision. Hyperopia is a result of the eyeball being too short from front to back; the condition is also called farsightedness. Myopia is described as the error of refraction in which rays of light entering the eye parallel to the optic axis are brought to a focus in front of the retina as a result of the eyeball being too long from front to back; the condition is also called nearsightedness.

A number of methods have been used to treat presbyopia, alone or in combination with hyperopia and myopia. These include two or more complete sets of ophthalmic glasses (spectacles); for example, one set for distance vision and another set for near or reading vision. An additional method uses half-size reading glasses ("granny glasses") to correct for the near vision while the distance vision remains normal or uncorrected. The most common method of correction of presbyopia is the use of bifocal or multifocal spectacle eyeglasses.

A number of methods employing contact lenses have been used to correct near and distance vision, for example, the use of a near vision contact lens on one eye and a distance vision contact lens on the other eye (monovision), concentric annular bifocal contact lenses, fused bifocal contact lenses, variable front surface power contact lenses, a combination of distance vision contact lenses with half vision spectacle reading glasses, and the like. Additional methods, including the use of bifocal contact lenses, are described in *Contact Lens Practice*, Third Edition, by R. B. Mandell, published by Charles C. Thomas of Springfield, Il., in 1981, particularly pp. 704–731, and in a number of patents, e.g., U.S. Pat. Nos. 3,031,927; 3,279,878; 3,950,082; 4,618,229; 4,199,231; 4,318,595 and 4,324,461; and U.K. Pat. No. 2,033,101.

Bifocal contact lenses have typically had two distinct optical zones within a single lens. In a hard bifocal contact lens, the different optical zones have often been achieved by fusing together materials having different indices of refraction. Another method of creating different optical zones is by cutting differently curved segments (zones) on the surface of the lens.

In a translating bifocal contact lens, the lens must translate the vertical distance of one optical zone over the pupil of the eye so that the wearer can see through the other optical zone. With certain previous lenses, the large adhesive forces of the lens to the cornea and sclera (the bulbs conjunctiva) precluded the necessary reliable translation.

With the recent development of the plastics industry, it has been found that methacrylic ester polymers alone or those obtained by copolymerizing a methacrylic ester, such as methyl methacrylate, with other comonomers have superior properties of phtotransmission, density, stability, oxygen permeability and the like, and have been used extensively as contact lens materials.

Hard lenses are usually produced using the polymerized monomer, methyl methacrylate. The poly(methylmethacrylate) contact lens is essentially nonpermeable to oxygen, so corneal edema (swelling and clouding of the cornea) has often been a problem when these contact lenses are used. These hard lenses are usually small, on the order of about 7.5 to 9.5 mm in diameter and are held to the cornea of the eye by the forces of the tear layer. A small optically decentered bifocal contact lens was reported by C. M. Taylor in *The Optician*, Vol. 149, pp. 287–8 (1965). The lens described is a hard lens having a maximum overall diameter of 9.7 mm.

Rigid, gas permeable contact lenses are made from materials including polymerized comonomers such as cellulose acetate butyrate (see U.S. Pat. No. 3,900,250) or acrylate-silicone esters (see, for example, U.S. Pat. Nos. 3,080,178 [Re. 31,406] and 4,216,303). These rigid, gas permeable lenses, as the term implies, are permeable to oxygen in varying degrees, thus reducing or eliminating corneal edema. These rigid lenses are also small, on the order of about 7.5 mm to 9.5 mm in diameter.

Neefe (U.S. Pat. No. 4,239,712) describes a bifocal contact lens wherein the near vision segment is an upturned crescent cut on an eccentric lathe while protecting an already-polished distance segment by coating it with a protective polymer layer. The Neefe contact lens, however, only provides for prism to be incorporated into the anterior or the posterior curves, lacking the weight distribution and optical effects from combining prism offered by the present invention's use of prism in both the base curve and in the distance vision curve. Thus, a compound prism is obtained in the distance segment of the present invention (e.g. if there are 1.75 diopters of prism in the base curve and 1.25 diopters of prism in the distance segment front curve, the distance vision zone would offer effectively 3.0 diopters of prism, while the near vision segment would have the 1.75 diopters of prism from the base curve only.) Another feature distinguishing the lens of the present invention and the Neefe lens is the effect of the lenticular zone combined with the above-described prism; use of a lenticular zone is very effective in distributing mass and allows more options for selecting and controlling edge thickness. Also the lens of the present invention has uniformly thickening edge (from apex to ballast), adding to the comfort of the lens and improving its ability to translate. The Neefe lens employs a small rim portion to add ballast and to prevent the near segment from sliding beneath the lower lid in the reading position, but does not offer the uniformly thickening edge and variety of lens parameter permutations which are available with the lens of the present invention.

A protective coating technique is also taught in U.S. Pat. No. 3,300,909 to Cooper, et al., but there, prism is only provided in the distance curve; the combined prism, lenticular zone and uniformly thickening edge of the present invention are not shown or even suggested.

None of the prior art bifocal contact lenses, hard or hydrogel, are free from all adverse physical and optical effects, such as low oxygen permeability, irritation, severe optical jump, blurring, simultaneous vision effects (double vision), and the like. Thus, prior attempts to solve the presbyopia problem using the aforementioned techniques cannot be said to be ideal for all wearers.

It would, therefore, be valuable to have a small, rigid, gas permeable bifocal contact lens, which will reliably translate vertically up and down on the cornea. Reliable translation requires that the portion of the pupil covered normally by the distance vision optical zone be substantially covered by the near vision optical zone when required. Thus, the wearer achieves good vision in both optical zones with a minimum of physical and optical side effects.

SUMMARY OF THE INVENTION

A bifocal contact lens is disclosed, having a convex anterior surface, a concave posterior surface, a circumferential edge, an apex and a ballast. A base curve is formed on the posterior surface; shaped to fit the cornea of an eye. The base curve has a first prism component. A distance vision optical segment is formed on the anterior surface and disposed towards the apex. The distance vision optical segment has a second prism component, disposed on the anterior surface. The second prism component, when combined with the first prism component, the thickness of the distance vision optical segment and the refractive index of the lens material, defines the optical correction of the distance vision optical segment. A near vision optical segment is formed on the anterior surface and disposed towards the ballast. The near vision optical segment has no prism component on the anterior surface, but does have the prism of the base curve on the posterior surface. The first prism component, when combined with the thickness of the near vision optical segment and the refractive index of the lens material, defines the optical correction of the near vision optical segment. An optional lenticular segment may also be included on the anterior surface. The first and second prism components also combine (with or without the optional lenticular segment) to reduce and distribute the mass of the lens. The lens may, optionally, be truncated at its ballast.

The bifocal contact lens can be lathe cut from a polymer button having an anterior surface, a posterior surface, a circumferential edge, and a geometric center, by a method including the steps of:

(a) rotating the button about a first axis of rotation, the first axis being perpendicular to the intersection of the button's horizontal and vertical axis and offset from its geometric center along the vertical axis;

(b) forming a base curve on the posterior surface, the base curve being defined as a continuous arc centered about a point selected along the first axis of rotation;

(c) rotating the button about a second axis of rotation, the second axis being parallel to the first axis and passing through the button's geometric center;

(d) forming a near vision optical zone on the anterior surface, the near vision optical zone being defined as a continuous arc centered about a second point selected along the second axis of rotation, the near vision optical zone being restricted over a predetermined area of the anterior surface;

(e) covering the anterior surface with a protective coating;

(f) rotating the button about a third axis of rotation, the third axis being parallel to the first and second axes and offset from the geometric center along the vertical axis in a direction opposite of the first axis; and (g) forming a distance vision optical zone on the anterior surface, the distance vision optical zone being defined as a continuous arc centered about a point selected along the third axis of rotation, the distance vision optical zone being restricted over a predetermined area of the anterior surface.

DETAILED DESCRIPTION OF THE PREFERRED EMBODIMENTS

Figure 1:
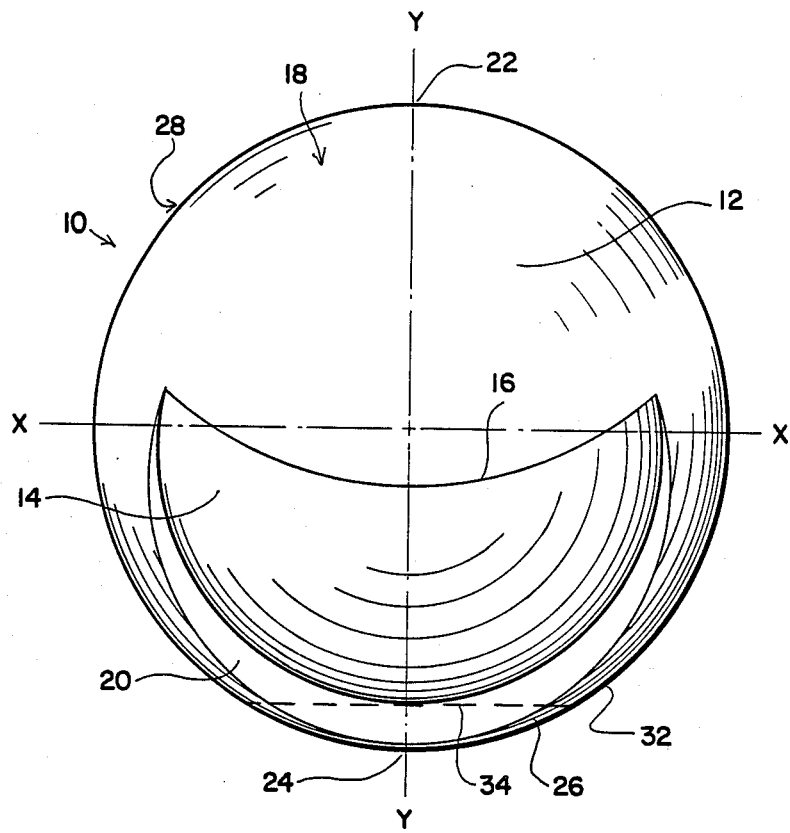
FIG. 1 is a front view of a rigid, gas permeable bifocal contact lens of the present invention, illustrating the optional, truncated embodiment of the invention in dashed line.

Referring to FIG. 1, a rigid, gas permeable bifocal contact lens 10 has a distance vision optical zone 12 and a near vision (or add) optical zone 14, defined by an upturned, crescent-shaped boundary 16. The optical zones 12 and 14 are formed on an anterior surface 18 of the lens 10. A lenticular zone 20 is also formed on the anterior surface of the lens. An apex 22 (or top portion) and a ballast 24 (or bottom portion) are both disposed along a vertical (Y—Y) axis. A continuation 26 of the anterior curve which forms the distance vision optical zone 12 is disposed between the bottom of the lenticular zone 20 and the bottom 24 of the lens. The lens 10 has a posterior surface 28 on which a base curve 30 is formed (best illustrated in FIG. 3). Both the distance vision optical zone 12 and the base curve 30 incorporate a prismatic component, the combination serving both to distribute the weight of the lens 10 and to affect its refraction. The lens has an outer circumference or edge 32, a bottom part of which may optionally be truncated, for example as illustrated by dashed line 34 in FIG. 1.

The lens 10 will now be described in greater detail by reference to a method of manufacturing it from a button (or blank) 40, with particular reference to FIGS. 2 and 3. Described is the lathe cut manufacture of a preferred embodiment in which the near vision optical zone 14 is shaped as an up-turned crescent, and is surrounded, except at its upper boundary with the distance vision optical zone, by a lenticular segment.

The button 40 has an original circumference (or edge) as indicated by dashed line 42, having a diameter of approximately 12 to 15 millimeters, in a preferred embodiment about 12.7 millimeters. The button is first mounted on a mandrel (or secured in a chuck) coaxially about its original geometric center 44, which falls at the intersection of the X—X and Y—Y axes. A mark (not shown) may be placed on the edge 42, for example at its intersection with the Y—Y axis at the bottom of the button, in order to help orient the button for the respective cutting operations.

Figure 2:
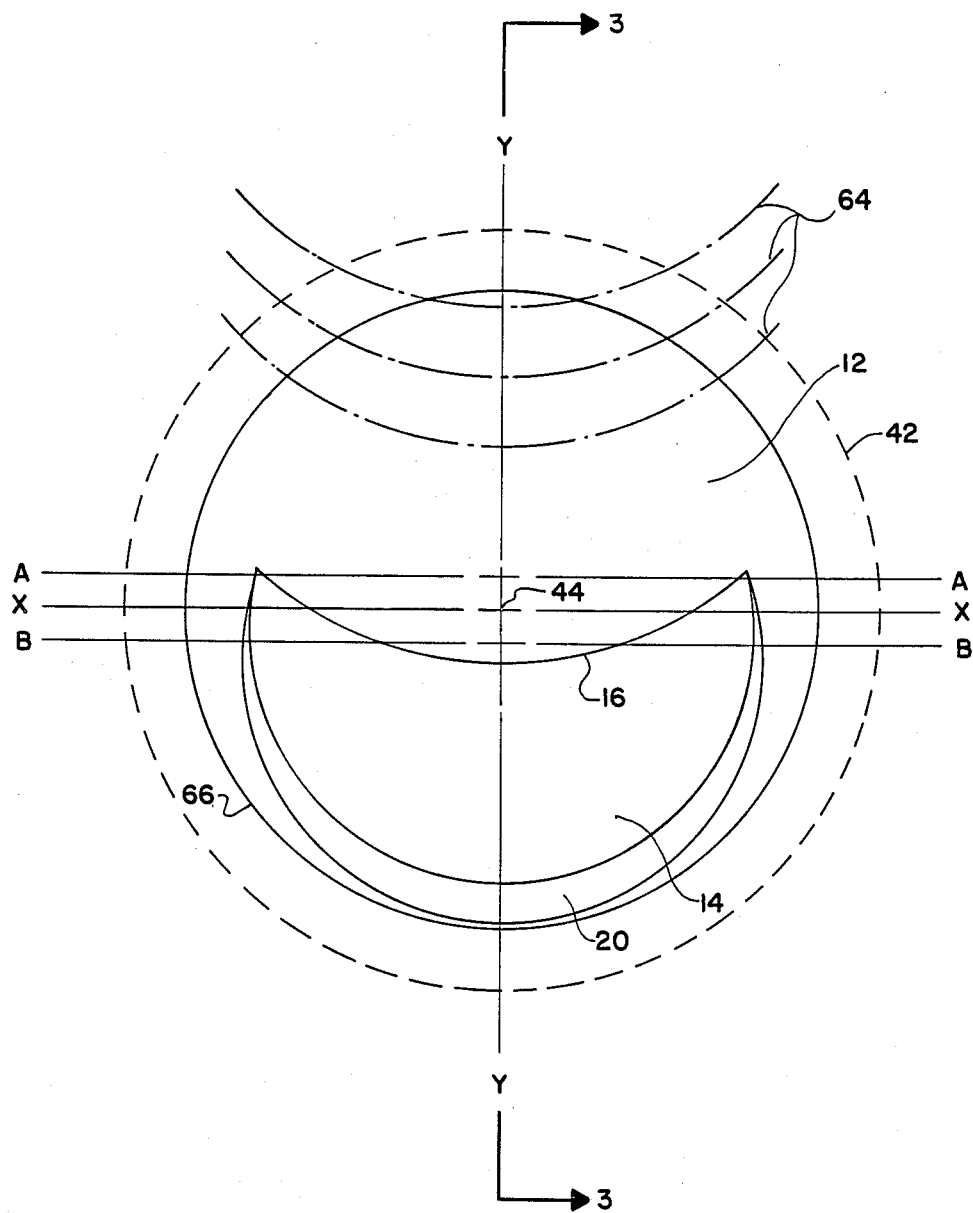
FIG. 2 is a front diagrammatic view of a button or a blank used to make a contact lens, marked to illustrate the various curves and axes used to make the bifocal contact lens of the present invention.
Figure 3:
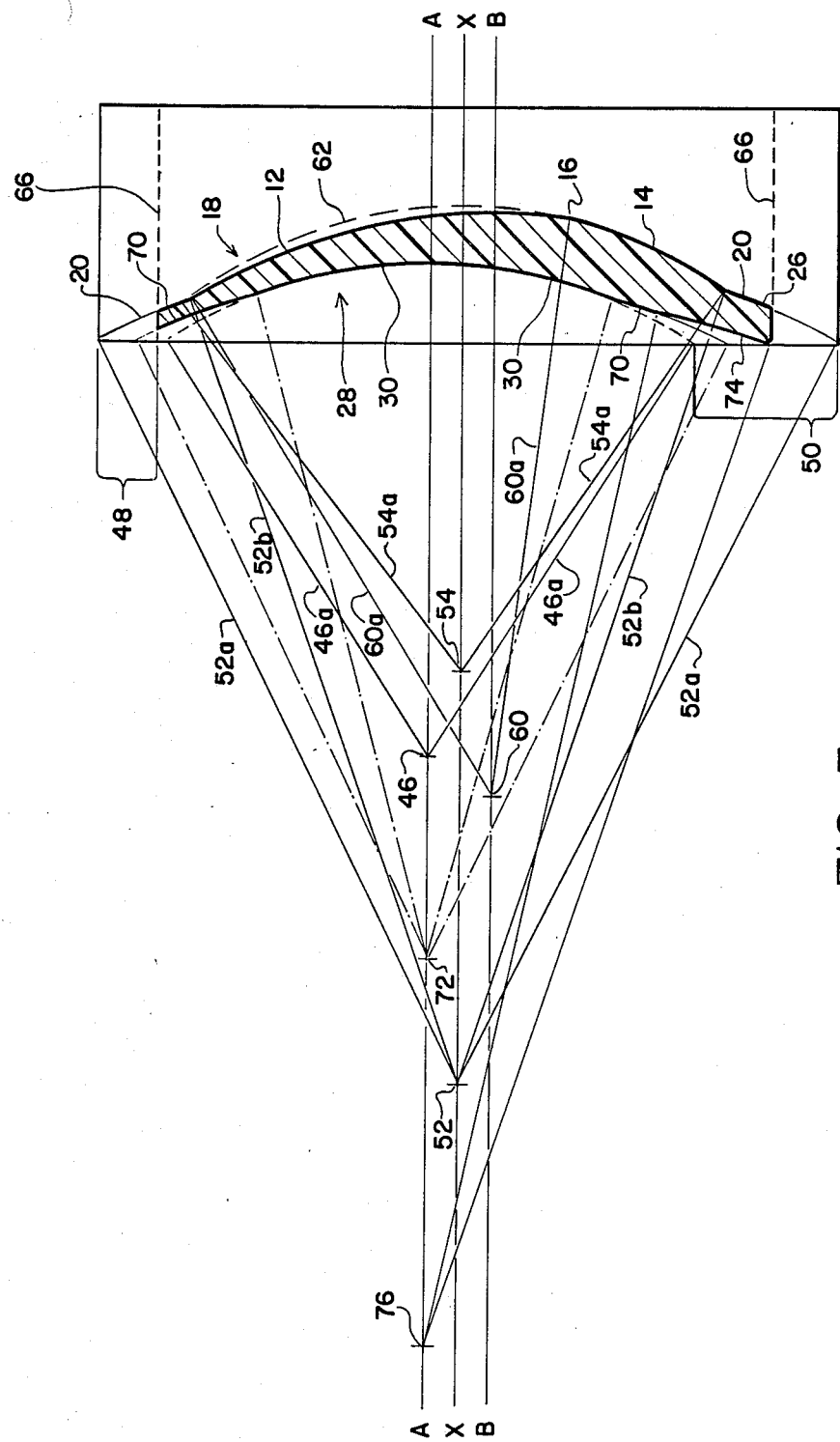
FIG. 3 is an enlarged, cross-sectional view of the button of FIG. 2, taken along line 3—3 in FIG. 2, showing the arcs and radii which are used to cut the various curves in a blank to make a bifocal lens according to the present invention.

The button is shifted about 0.0075 inches downward from the original geometric center 44 along the Y—Y axis, to have a new, higher axis of rotation, shown as horizontal line A—A in FIGS. 2 and 3, about which the button is rotated. The base curve 30 is cut into the posterior surface 28 of the button 40 as an arc centered, for example, about point 46, between radii 46a, leaving a smaller uncut margin 48 towards the apex and a larger uncut margin 50 toward the ballast, thereby introducing prism into the base curve with respect to the original geometric center of the button 40. The base curve is polished and the button is released from the mandrel (or chuck).

The button 40 is inverted and posterior surface 28 is mounted onto a mandrel having a surface reciprocal to the base curve 30 (both in curvature and in displacement from its own center of rotation.) The anterior surface curves are then cut. First, rotating the button 40 about its original geometric center 44, the lenticular zone 20 is cut as an arc centered, for example, about point 52 on the X—X axis; the cut defined by this arc is restricted between the radii 52a (i.e. starting at the circumference 42 of the button) and radii 52b. Still rotating the button about its original geometric center, the curve for the near vision optical zone 14 is cut as an arc having a shorter radius, centered about point 54 on the X—X axis and extending between the radii 54a. Next, the first two front curves 14 and 20 (bearing the same reference numerals as the segments they define) are polished. Then, the entire front surface is laminated by coating it with blocking wax (or pitch), to protect a portion of the front surface during the subsequent cutting and polishing of the distance vision optical zone 12.

The button 40 is again shifted, this time upwardly from the original geometric center 44 along the vertical (Y—Y axis, to rotate about a new, lower axis (B—B in FIG. 3). By changing the axis on which the distance vision curve is cut, prism is introduced into the distance vision curve, vis-a-vis both the base curve 30 and the near vision segment 14. Thus, for example, if the base curve 30 incorporates 1.25 diopters of prism and if 1.75 diopters of prism are incorporated in the distance curve 12, there will effectively be 3.0 diopters of prism in the distance vision segment and 1.25 diopters of prism in the near vision segment (a difference of 1.75 diopters between segments). The distance segment 12 is cut as an arc centered, for example, at point 60 on axis B—B, extending between radii 60a, removing a portion of the original near vision curve 14 (shown as dashed line 62 in FIG. 3). As best illustrated in FIG. 2 this cut is made by moving a rotary cutting instrument gradually along the Y—Y axis, from the apex toward the ballast, stopping at a predetermined point slightly below the original geometric center 44 of the button, thereby defining the crescent-shaped near vision segment 14 by the up-curved boundary 16, which corresponds to the edge shape of the rotary cutting instrument (see dashed line 64 in FIG. 2.) This off-centered cutting operation also forms the narrowing extension 26 of the distance curve which extends below the X—X axis, outside the optical portions of the lens. The distance curve 12 is then polished.

Next, the button 40 is cut to the final diameter for the lens 10, having a circumference indicated by line 66. This is done by turning the button along its original geometric center of rotation (i.e. along the X—X axis) and removing an annular segment until the desired diameter has been reached. The lens is then removed from the mandrel, cleaned and inspected.

The posterior surface 28 of the lens is worked for a second time. A secondary curve 70 is added towards the edge of the base curve 30 as an arc centered, for example, at point 72 along the A—A rotational axis (on which the base curve was cut). A third, or peripheral curve 74 is then cut, again toward the circumference of the lens, as a flatter curve centered, for example, about point 76 on the A—A axis. The posterior surface of the lens is then polished.

Figure 4:
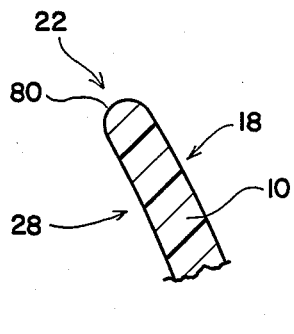
FIG. 4 is an enlarged, cross-sectional view of the apex of a lens of the present invention.
Figure 5:
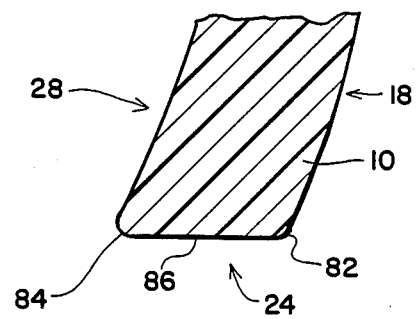
FIG. 5 is an enlarged, cross-sectional view of the lower edge of a lens of the present invention.

Once the diameter 64 has been cut, the edge 32 is shaped (also called edging the lens) by rounding the corners, as illustrated in the enlarged views of FIGS. 4 and 5. Thus, the apex 22 is rounded, as illustrated at 80 in FIG. 4. The ballast 24 is rounded at an anterior portion 82 and a posterior portion 84, connected by a relatively flattened portion 86. The thickness of the lens 10 is greater at the ballast 24 than at the apex 22 du to the prism in the lens.

Finally, if truncation is desired, a reference mark (not shown) is made on the lens to identify, for example, the apex 22 at the Y—Y axis. The lens is held in a desired orientation with respect to the X—X and Y—Y axes (the truncation must be set to cause the lens to rest on the lower eyelid; accommodation may be necessary for nasal or temporal shift due to a particular patient's lid configuration) with the ballast exposed, and a portion thereof is removed, for example, the portion illustrated by dashed line 34 in FIG. 1. Truncation is introduced into the lens 10 using a flat rotating surface with a fine grit abrasive. (In some cases, the truncation is slightly rounded, to better conform to the shape of the wearer's lower lid.) The truncated ballast is edged as described above, and the entire edge is polished. The lens 10 is then de-mounted, cleaned and inspected.

Bifocal contact lenses made according to the foregoing description have been successfully employed in presbyopic patients and have given them good visual correction. The lens translates easily between the near and distance vision segments and does not present any significant "bifocal jump".

To those skilled in the art to which this invention relates, many changes in construction and widely differing embodiments and applications of the invention will suggest themselves without departing from the spirit and scope of the invention. For example, the lens of the present invention could be fabricated by known molding techniques. The optical zones could be formed as concentric rings (e.g. a central distance vision zone with prism, a surrounding near vision zone without prism, an optional lenticular zone surrounding the near vision zone on the anterior surface, and a base curve with prism on the posterior surface). The disclosure and the description herein are purely illustrative and are not intended to be in any sense limiting.

What is claimed is:

1. A method for making a bifocal contact lens from a polymer button having an anterior surface, a posterior surface, a circumferential edge, and a geometric center defined by the intersection of a horizontal axis and a vertical axis, said axes being parallel to the planes of said anterior and posterior surfaces, said method comprising the steps of:
  (a) rotating the button about a first axis of rotation, said first axis being perpendicular to the intersection of said horizontal and vertical axes and offset from said geometric center along said vertical axis;
  (b) forming a base curve in said posterior surface, said base curve being defined as a continuous arc centered about a point selected along said first axis of rotation;
  (c) rotating the button about a second axis of rotation, said second axis being parallel to said first axis and passing through said geometric center;
  (d) forming a near vision optical zone on said anterior surface, said near vision optical zone being defined as a continuous arc centered about a second point selected along said second axis of rotation, said near vision optical zone being restricted over a predetermined area of said anterior surface;
  (e) covering the anterior surface with a protective coating;
  (f) rotating the button about a third axis of rotation, said third axis being parallel to said first and second axes and offset from said geometric center along said vertical axis in a direction opposite of said first axis; and
  (g) forming a distance vision optical zone on said anterior surface, said distance vision optical zone being defined as a continuous arc centered about a point selected along said third axis of rotation, said distance vision optical zone being restricted over a predetermined area of said anterior surface.

2. The method of claim 1 wherein said distance vision optical zone is formed by moving a rotary cutting instrument gradually along the vertical axis from an apex end of said button towards a ballast end of said button, stopping at a apredetermined point slightly below the original geometric center of the button, thereby defining the near vision optical segment as being crescent shaped and having an up-curved boundary.

3. The method of claim 1 wherein said first axis of rotation is offset about 0.0075 inches from said geometric center.

4. The method of claim 1 comprising the additional step of removing a portion of the ballast of the lens before said final cleaning, polishing and inspecting step.

5. The method of claim 1 comprising the additional step of forming a lenticular zone on said anterior surface, said lenticular zone being defined as a continuous arc centered about a point selected along said second axis of rotation.

6. The method of claim 1 comprising the additional steps of:
  (h) rotating the button about said second axis of rotation;
  (i) removing an annular segment of the button until a desired lens diameter remains;
  (j) rotating the button about said first axis of rotation;
  (k) forming a secondary curve on said posterior surface surrounding said base curve, said secondary curve being defined as a continuous arc centered about a second point selected along said first axis of rotation;
  (l) forming a peripheral curve on said posterior surface surrounding said secondary curve, said peripheral curve being defined as a continuous arc centered about a third point selected along said first axis of rotation;
  (m) edging the lens; and
  (n) cleaning, polishing and inspecting the lens.

7. The method of claim 6 comprising the additional step of forming a lenticular zone on said anterior surface, said lenticular zone being defined as a continuous arc centered about a point selected along said second axis of rotation.

* * * * *